United States Patent
Spektor et al.

(10) Patent No.: US 10,518,578 B1
(45) Date of Patent: Dec. 31, 2019

(54) DUAL-STAGE SPRING LOADED CASTER

(71) Applicant: Hamilton Caster & Manufacturing Company, Hamilton, OH (US)

(72) Inventors: Yefim Spektor, Mason, OH (US); Patrick L. McCartney, Fairfield, OH (US); Lakshadeep Sandeep Goregaonkar, Cincinnati, OH (US); Julie Ann Johnson, Fairfield, OH (US); Jevon Robert Lambright, Cincinnati, OH (US)

(73) Assignee: Hamilton Caster & Manufacturing Company, Hamilton, OH (US)

( * ) Notice: Subject to any disclaimer, the term of this patent is extended or adjusted under 35 U.S.C. 154(b) by 0 days.

(21) Appl. No.: 16/199,736

(22) Filed: Nov. 26, 2018

(51) Int. Cl.
*B60B 33/04* (2006.01)
*B60B 33/06* (2006.01)
*B60B 33/00* (2006.01)

(52) U.S. Cl.
CPC ............ *B60B 33/045* (2013.01); *B60B 33/06* (2013.01); *B60B 33/0007* (2013.01); *B60B 33/0039* (2013.01); *Y10T 16/212* (2015.01)

(58) Field of Classification Search
CPC ....... B60B 33/045; B60B 33/04; B60B 33/06; B60B 33/063; B60B 33/066; Y10T 16/212
See application file for complete search history.

(56) References Cited

U.S. PATENT DOCUMENTS

| | | | |
|---|---|---|---|
| 968,790 A * | 8/1910 | Olsen | B60B 33/045 16/44 |
| 1,634,932 A | 7/1927 | Cook | |
| 2,082,017 A | 6/1937 | McClain | |
| 2,271,304 A * | 1/1942 | Mulholland | B60G 11/14 16/44 |
| 2,447,582 A | 8/1948 | Klumb | |
| 2,458,922 A | 1/1949 | Andresen | |
| 2,577,244 A | 12/1951 | Hedgpeth | |
| 2,885,720 A * | 5/1959 | Seeberger | B60B 33/021 16/44 |
| 2,915,776 A | 12/1959 | Hanson et al. | |
| 2,942,290 A * | 6/1960 | Segal | B60B 33/021 16/35 R |
| 3,102,298 A | 9/1963 | Sheahan | |
| 3,349,425 A | 10/1967 | Rabelos | |
| 4,099,695 A | 7/1978 | Shinn, Jr. | |
| 4,372,569 A | 2/1983 | Otterson | |

(Continued)

*Primary Examiner* — Jeffrey O'Brien
(74) *Attorney, Agent, or Firm* — Wood, Herron & Evans, LLP

(57) ABSTRACT

A dual-stage caster is disclosed. The caster includes a horn assembly and an arm assembly pivotally coupled to the horn assembly. The caster further includes a wheel rotatably mounted to the arm assembly and a mounting plate mounted to the horn assembly and configured be mounted to a transport vehicle. When the wheel is moved along a support surface, the arm assembly is in a neutral position and the wheel is in the up position. When the wheel moves into a depression in the support surface, the wheel stage spring moves the wheel from the up position to the down position and the arm assembly remains in the neutral position. When the wheel moves over a raised portion in the support surface, the arm assembly pivots relative to the horn assembly so as to compress the main stage spring. The caster may be a swivel caster or a rigid caster.

20 Claims, 8 Drawing Sheets

(56) References Cited

U.S. PATENT DOCUMENTS

| | | | | |
|---|---|---|---|---|
| 4,543,685 A * | 10/1985 | Kassai | ............... | B60B 33/0078 16/35 R |
| 4,559,669 A * | 12/1985 | Bonzer | ............... | B60B 33/045 16/44 |
| 4,649,596 A | 3/1987 | Kassai | | |
| 4,763,910 A * | 8/1988 | Brandli | ............. | B60B 33/0042 16/44 |
| 5,347,680 A * | 9/1994 | Rippe | ............... | B60B 33/0042 16/18 R |
| 5,351,364 A | 10/1994 | Zun | | |
| 5,355,550 A | 10/1994 | Yang | | |
| 6,357,077 B1 * | 3/2002 | Jones, Jr. | ............. | B60B 33/045 16/35 D |
| 6,473,935 B1 * | 11/2002 | Cherukuri | ........... | B60B 33/0005 16/33 |
| 6,484,359 B1 * | 11/2002 | Guttmann | ............ | B60B 33/045 16/18 R |
| 6,539,578 B1 * | 4/2003 | Guttmann | ........... | B60B 33/0018 16/44 |
| 9,956,822 B1 * | 5/2018 | Yu | ......................... | B60B 33/045 |
| 10,315,900 B2 * | 6/2019 | Goncalves | .......... | B66F 9/07586 |
| 2007/0143957 A1 * | 6/2007 | Baek | .................... | B60B 33/045 16/44 |
| 2017/0015140 A1 * | 1/2017 | Sekine | ............... | B60B 33/0042 |
| 2018/0110490 A1 * | 4/2018 | Nam | .................... | A61B 6/4405 |
| 2018/0296410 A1 * | 10/2018 | Delmatoff | ............ | A61G 5/1078 |

\* cited by examiner

DUAL-STAGE SPRING LOADED CASTER

TECHNICAL FIELD

The present invention relates generally to casters, and more particularly, to shock absorbing casters used on uneven surfaces.

BACKGROUND

Casters are commonly mounted to transport vehicles, such as carts, trailers, trucks, or dollies, and allow for rolling movement of the transport vehicle along a ground surface. Conventional casters generally include a horn (also referred to as a yoke) having a pair of legs that extend downwardly and support a caster wheel that rolls along the ground surface.

Casters may be designed to rotate, or "swivel," about a vertical axis (termed "swivel" casters), or they may be fixed (termed "rigid" casters). Conventional swivel casters generally include a horn that is rotatably coupled to a swivel plate, which in turn is mounted to a vehicle, such that the horn and caster wheel may swivel about a vertical swivel axis relative to the swivel plate and the vehicle. This swiveling action enables the caster wheel to change direction while rolling, thereby allowing an operator to turn or otherwise steer the vehicle. In contrast, rigid casters generally include a horn that is rigidly attached to the vehicle via a mounting plate, such that the caster wheel does not swivel. Transport vehicles may be fitted with one or more swivel casters and one or more rigid casters, depending on the application and vehicle design. In a common arrangement, a vehicle may include swivel casters on a rear operator-end of the vehicle, and rigid casters on a front end of the vehicle. For improved vehicle maneuverability in tight spaces, the vehicle may be provided with swivel casters at both vehicle ends, as often seen on grocery carts, for example.

A transport vehicle with conventional casters may be used on rough or uneven surfaces. As such, the goods carried on the transport vehicle may be subject to damage because of the rough or uneven surfaces. Casters with a spring mechanism have been used on such transport vehicles to reduce the shock or possible damage to those goods carried on the transport vehicle over the rough or uneven surfaces. While absorbing shock due to the uneven surfaces, the transport vehicle may encounter depressions in the floor surface sufficiently deep to cause the spring loaded caster to lose contact with the surface. Should the caster over such a depression be a swivel caster, it will likely lose its alignment with the direction of travel. Keeping all mounted casters in contact with the floor, regardless of condition, may not be achievable with standard spring-loaded casters.

Accordingly, there remains a need for improvements to casters used on rough or uneven surfaces to address the shortcomings described above.

SUMMARY

A caster according to an exemplary embodiment of the invention includes a horn assembly including a first main stage spring operatively coupled to a first main stage plunger. The caster further includes an arm assembly having a first arm and a second arm, each arm being pivotally coupled to the horn assembly, and each arm being operatively coupled to the first main stage plunger. The caster also includes a wheel disposed between the first arm and the second arm and being rotatably mounted to an axle. The axle extends through an elongated axle hole in each arm of the arm assembly. A wheel stage spring is operatively coupled to the axle and configured to bias the axle downwardly in each elongated axle hole. The wheel is movable in the elongated axle hole between an up position and a down position. The caster includes a mounting plate mounted to the horn assembly and configured to be mounted to a transport vehicle. When the wheel is moved along a support surface, the arm assembly is in a neutral position and the wheel is in the up position. When the wheel moves into a depression in the support surface, the wheel stage spring moves the wheel from the up position to the down position and the arm assembly remains in the neutral position. When the wheel moves over a raised portion in the support surface, the arm assembly pivots relative to the horn assembly so as to compress the main stage spring.

In an embodiment, the first arm includes a bracket and the wheel stage spring is slidably mounted to a wheel stage plunger, which is mounted to the wheel axle and operatively coupled to the bracket.

In an embodiment, the horn assembly further includes a main stage plunger rod configured to operatively couple the first main stage plunger to the first arm and the second arm.

In an embodiment, the first main stage spring is preloaded to a predetermined amount.

In an embodiment, the horn assembly further includes a second main stage spring operatively coupled to a second main stage plunger. The horn assembly may also include a main stage plunger rod configured to operatively couple the first main stage plunger to the first arm and the second main stage plunger to the second arm. The horn assembly further include an inner spacer mounted to the main stage plunger rod between the first main stage plunger and the second main stage plunger. The horn assembly may further include a first outer spacer mounted to the main stage plunger between the first main stage plunger and the first arm and a second outer spacer mounted to the main stage plunger between the second main stage plunger and the second arm.

In an embodiment the mounting plate is rotatably mounted to the horn assembly. In another embodiment the mounting plate is fixedly mounted to the horn assembly.

A transport vehicle according to another exemplary embodiment of the invention includes at least one caster similar to those described above.

Various additional features and advantages of the invention will become more apparent to those of ordinary skill in the art upon review of the following detailed description of multiple illustrative embodiments taken in conjunction with the accompanying drawings. The drawings, which are incorporated in and constitute a part of this specification, illustrate multiple embodiments of the invention and, together with the general description given above and the detailed description given below, serve to explain the multiple embodiments of the invention.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 5 is a cross-sectional view of the swivel caster of FIG. 2 taken along line 5-5.

FIG. 6 is a partial cross-sectional view of the swivel caster of FIG. 2 taken along line 6-6.

DETAILED DESCRIPTION

Figure 1:
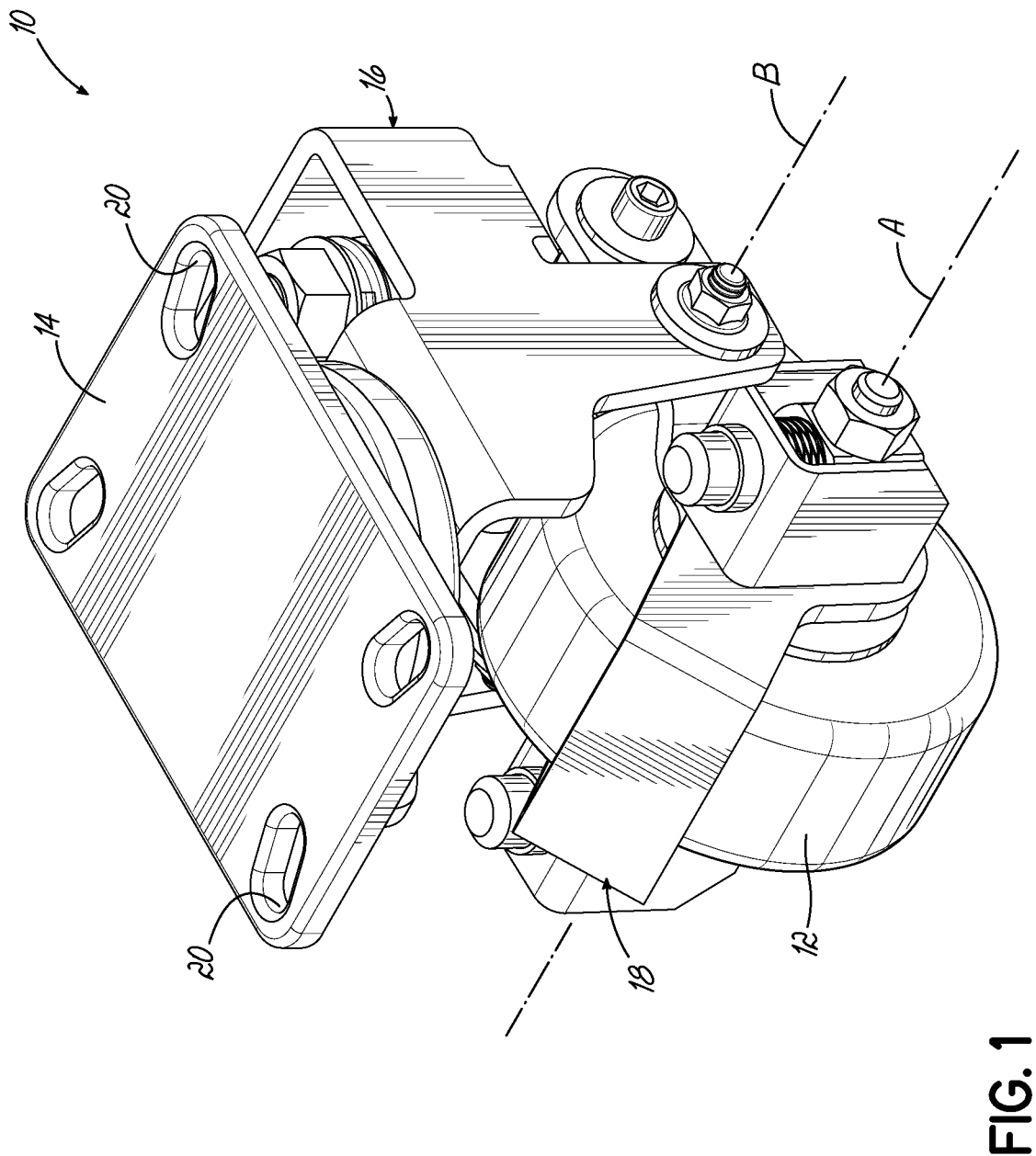
FIG. 1 is a top perspective view of a swivel caster with a dual-stage spring arrangement in accordance with an exemplary embodiment of the invention.
Figure 2:
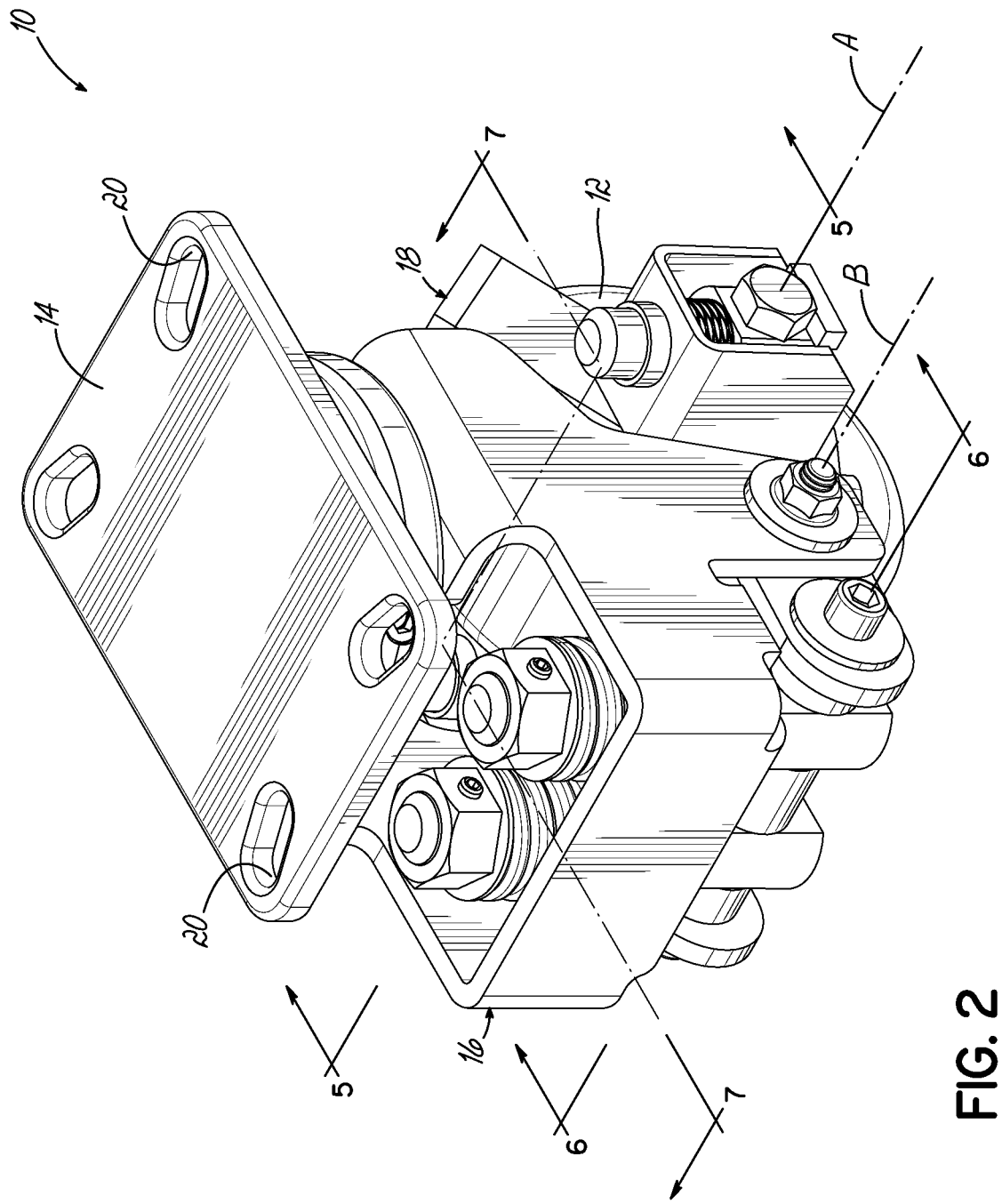
FIG. 2 is another top perspective view of the swivel caster of FIG. 1.

FIGS. 1 and 2 show a swivel caster 10 according to an exemplary embodiment of the invention. The swivel caster 10 includes a wheel 12, a mounting plate 14, a horn assembly 16, and an arm assembly 18. The mounting plate 14 has elongated mounting holes 20 so that it may be mounted to a transport vehicle, such as a platform truck (see FIGS. 7-9), using threaded fasteners (not shown). The mounting plate 14 is rotatably mounted to horn assembly 16 as will be described in greater detail below. The wheel 12 is rotatably mounted to the arm assembly 18 so that the wheel 12 may rotate (spin) about axis A. The arm assembly 18 is pivotally mounted to horn assembly 16 so that the arm assembly 18 may pivot about axis B relative to the horn assembly 16. While the description and figures of the invention focus primarily on the structure and operation of the swivel caster 10, the invention may also be incorporated into a rigid caster. In a rigid caster the structure and operation is similar to that of the swivel caster 10, except that mounting plate 14 is fixedly mounted (e.g., welded) to the horn assembly 16 such that the horn assembly 16 may not rotate relative to the transport vehicle.

Figure 3:
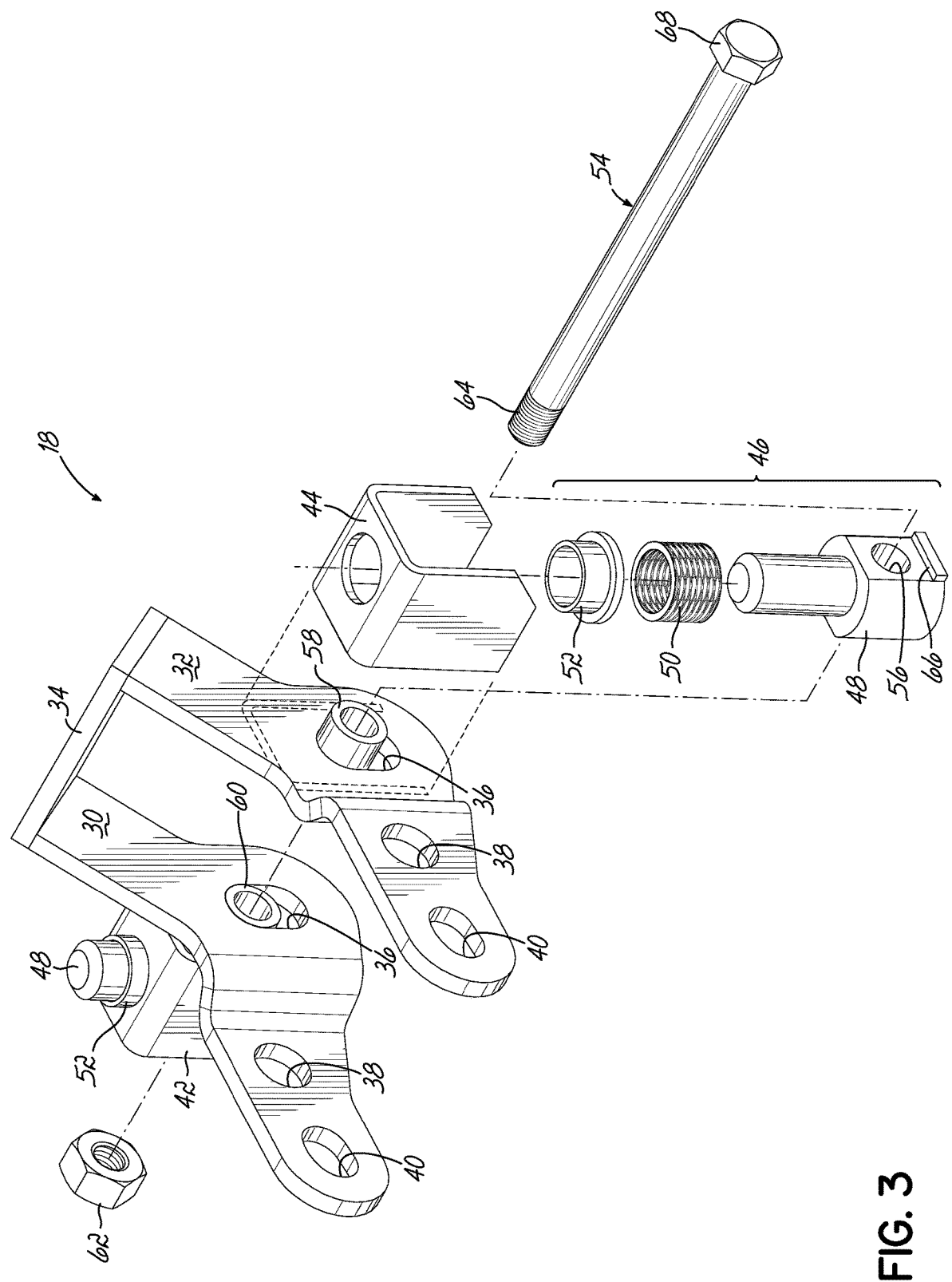
FIG. 3 is a disassembled prospective view of the arm assembly of the swivel caster of FIGS. 1 and 2.

FIG. 3 shows the arm assembly 18 disassembled. The arm assembly 18 includes opposing arms 30, 32 connected by a stiffener plate 34. Each arm 30, 32 includes an elongated axle hole 36, a fulcrum hole 38, and an elongated plunger rod hole 40. Each arm 30, 32 has a bracket 42, 44 affixed to it. One of the brackets 44 is shown separated from arm 32 in FIG. 3 for illustration purposes only. The arm assembly 18 further includes a wheel stage plunger assembly 46 operatively coupled to each bracket 42, 44. Each wheel stage plunger assembly 46 includes a wheel stage plunger 48, a wheel stage spring 50, and a bushing 52. A wheel axle 54 is inserted through a hole 56 in each wheel stage plunger 48, through a wheel stage spacer 58, through the center of the wheel 12, through a wheel stage spacer 60, and then through the hole 56 of the other wheel stage plunger 48. A nut 62 is threaded onto a threaded end 64 of the wheel axle 54 to thereby rotatably mount the wheel 12 to the arm assembly 18. One of the wheel stage plungers 48 includes a lip 66 which is configured to engage a head 68 of the wheel axle 54 such that the wheel axle 54 cannot rotate relative to the arm assembly 18.

Figure 4:
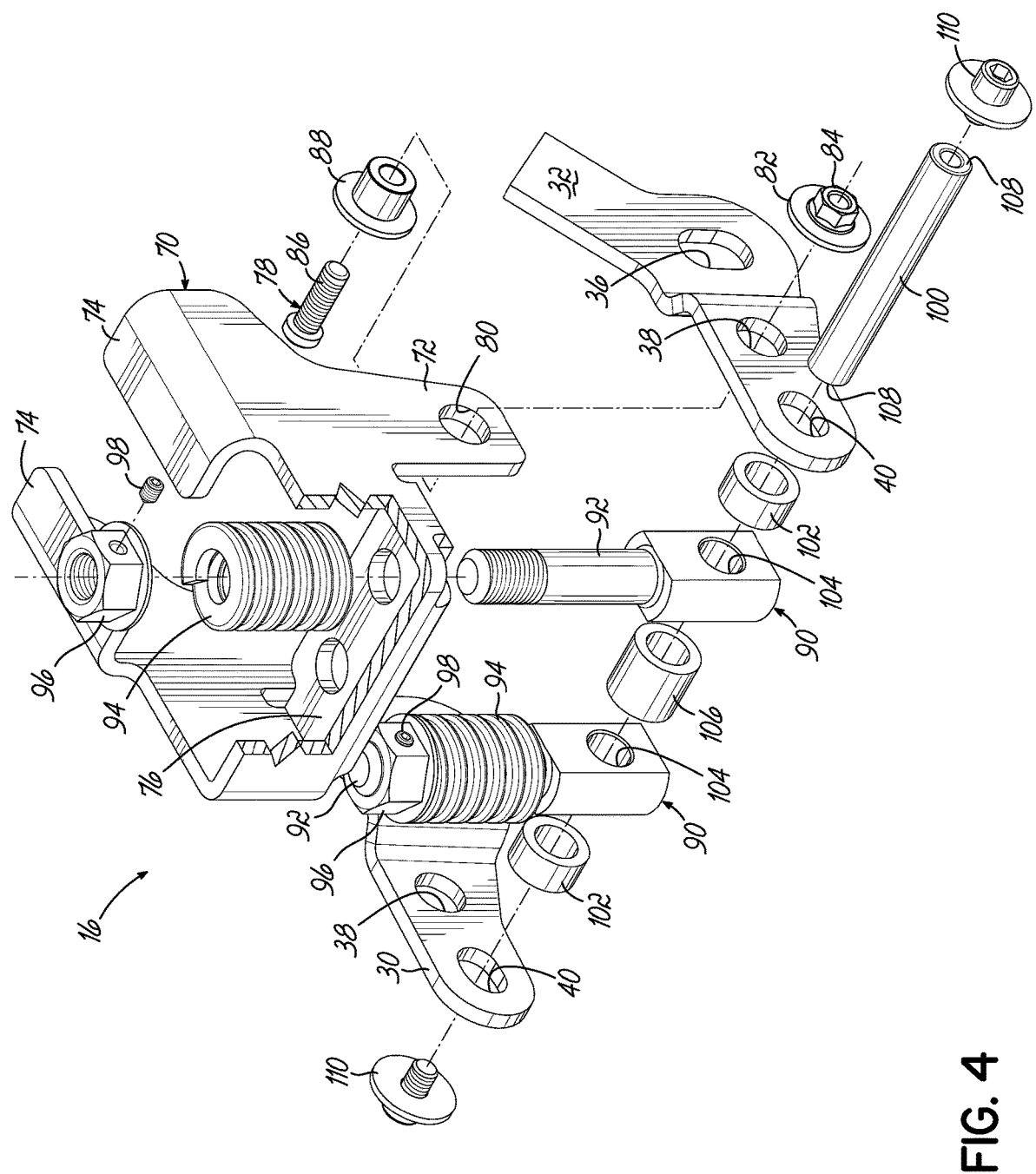
FIG. 4 is a disassembled prospective view of the horn assembly of the swivel caster of FIGS. 1 and 2.

FIG. 4 shows the horn assembly 16 disassembled. The horn assembly 16 includes a horn 70, which includes opposing side mounting tabs 72, mounting plate support members 74, and a spring mounting plate 76. The arm assembly 18 is pivotally mounted to horn assembly 16 by inserting threaded fasteners 78 through bushings 88, fulcrum holes 80 in the side of both the side mounting tabs 72 of the horn 70 and through the fulcrum holes 38 in arms 30, 32 of the arm assembly 18 and affixed a washer 82 and nut 84 onto a threaded end 86 of the threaded fastener 78.

With further reference to FIG. 4, the horn assembly 16 includes a pair of main stage plunger assemblies 90. Each main stage plunger assembly 90 includes a main stage plunger 92, a main stage spring 94, a flange nut 96, and a set screw 98. Each main stage plunger assembly 90 is attached to the arms 30, 32 via a main spring plunger rod 100 extending through plunger rod holes 40, through outer spacers 102, holes 104 in the main stage plungers 92, and an inner spacer 106. Opposing ends 108 of main spring plunger rod 100 are threaded to received threaded fasteners 110 to secure the main spring plunger rod 100 to the arms 30, 32.

Figures 5, 6:
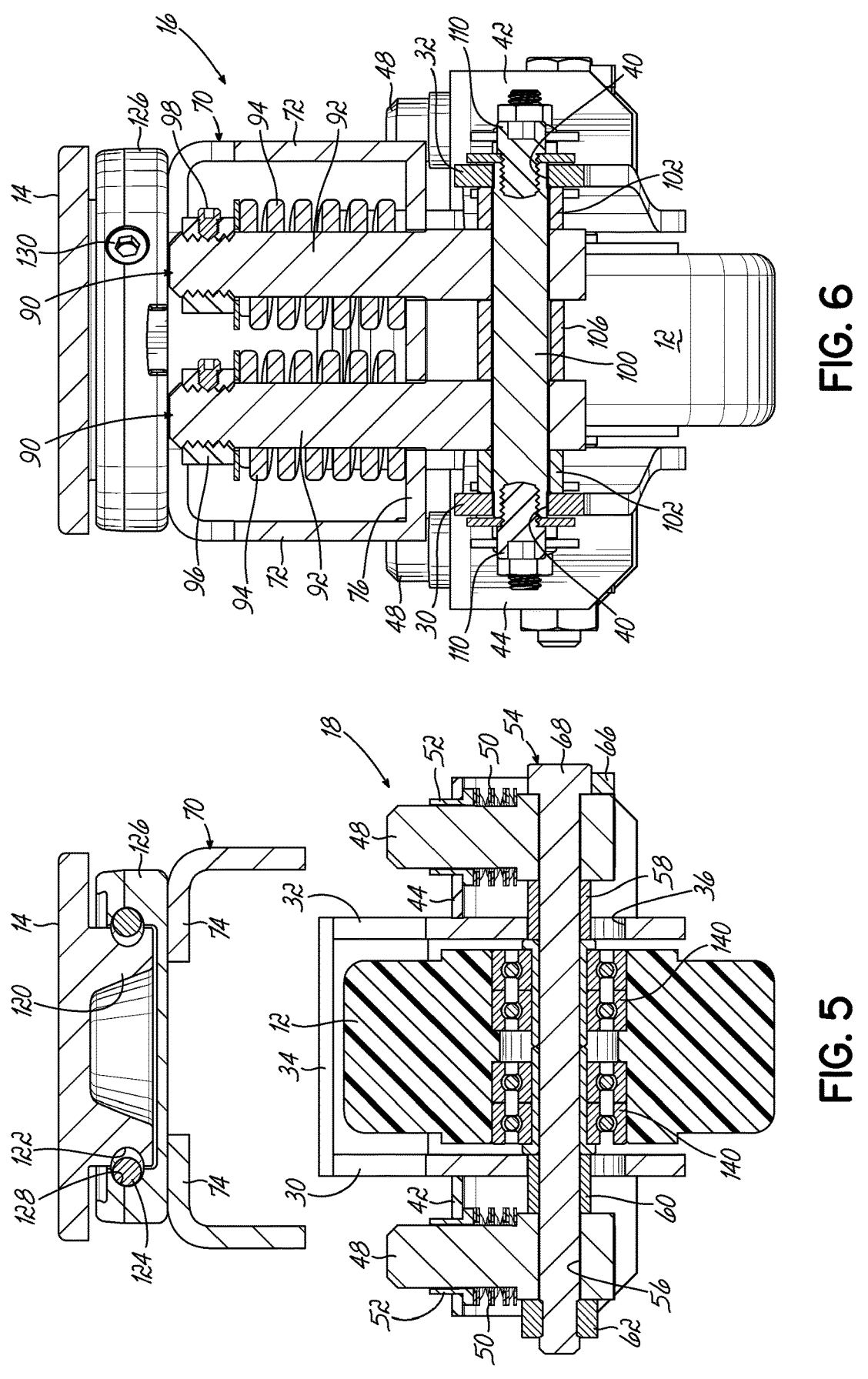

As shown in FIG. 5 the mounting plate 14 includes a circular core 120 that includes a race 122 that is configured to cooperate with ball bearings 124. A swivel ring 126 is affixed to the mounting plate support members 74 of horn 70. The swivel ring 126 includes a complementary race 128 that is configured to cooperate with ball bearings 124 such that the mounting plate 14 may freely rotate relative to the swivel ring 126. A set screw 130 (FIG. 6) may be periodically removed from the swivel ring 126 so that lubricant may be injected into the swivel ring 126 to lubricate the race 122, the ball bearings 124, and race 128.

FIG. 5 also shows the assembled arm assembly 18 and the wheel 12 rotatably mounted to wheel axle 54. Wheel 12 may include a set of internal bearings 140 so that the wheel 12 may freely rotate about the fixed wheel axle 54. When the swivel caster 10 is mounted to a transport vehicle such as platform truck (see FIGS. 7-9) and the wheel 12 is resting on a support surface, the weight of the transport vehicle pushes the horn assembly 16 downward such that the wheel axle 54 and wheel stage spacers 58, 60 move to the top of the elongated axle holes 36 thereby compressing the wheel stage springs 50.

Figure 7:
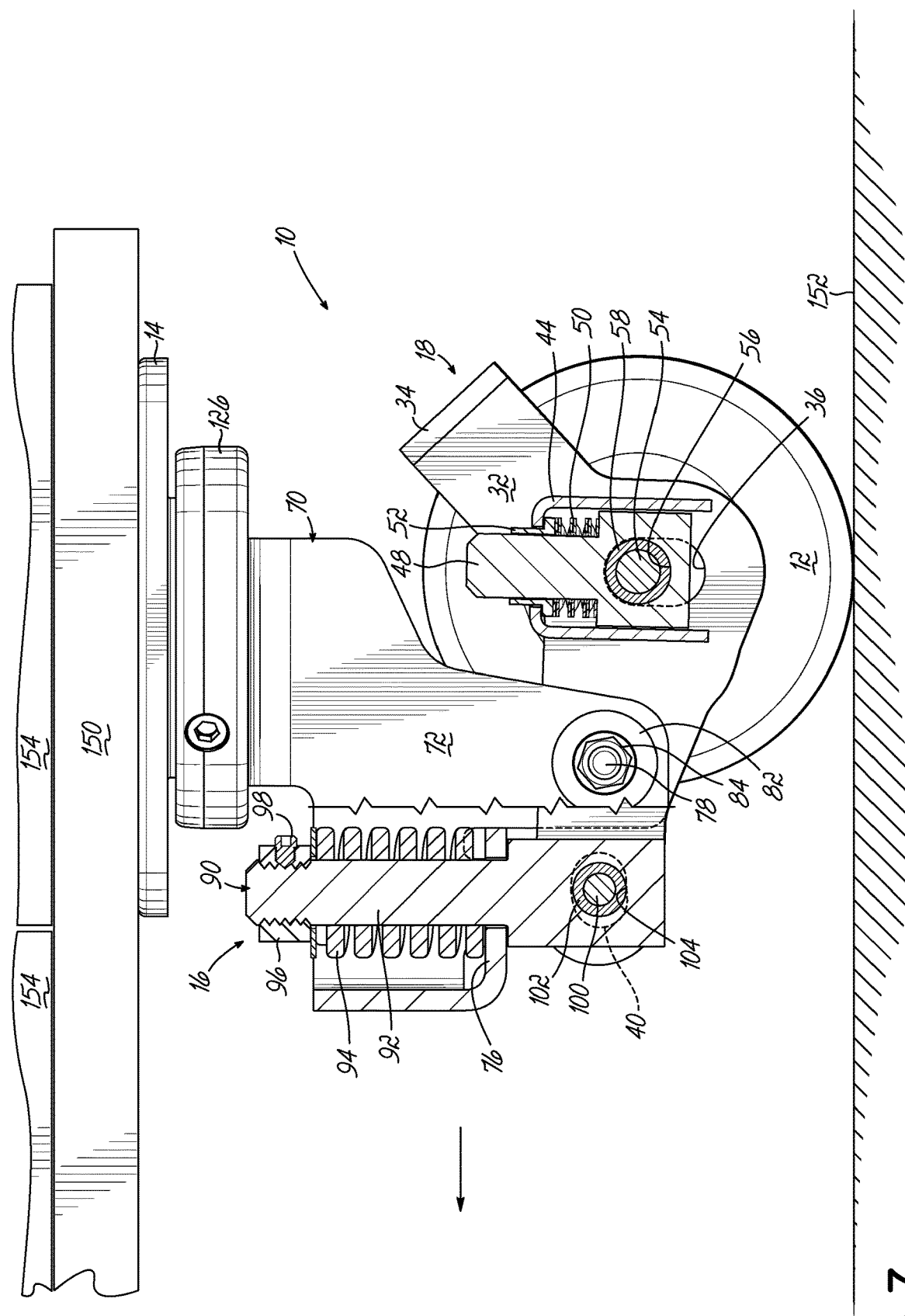
FIG. 7 is a partial cross-sectional view of the swivel caster of FIG. 2 taken along line 7-7 with the wheel on a support surface.

FIG. 6 shows the horn assembly 16. When assembled, the main stage springs 94 are preloaded by tightening flange nut 96 to a predetermined amount according to the expected load carried by the swivel caster 10. After the preload is set in the main stage springs 94, the set screws 98 are tightened to engage the threaded portion of each main stage plunger 92 such that the preload is fixed. As shown in FIG. 7, the swivel caster 10 may be mounted to a transport vehicle 150 such as a platform truck and the wheel 12 is resting on a support surface 152 and a load 154 is on the transport vehicle 150. When the load 154 is within the limits of the preload of the main stage springs 94, the arm assembly 18 achieves a neutral position. In the exemplary embodiment shown in FIG. 7, when the arm assembly 18 is in the neutral position relative to the horn assembly 16, the main spring plunger rod 100 is substantially vertically aligned with threaded fastener 78. Other criteria may be used to define the orientation of the arm assembly 18 when it is in the neutral position.

Figure 8:
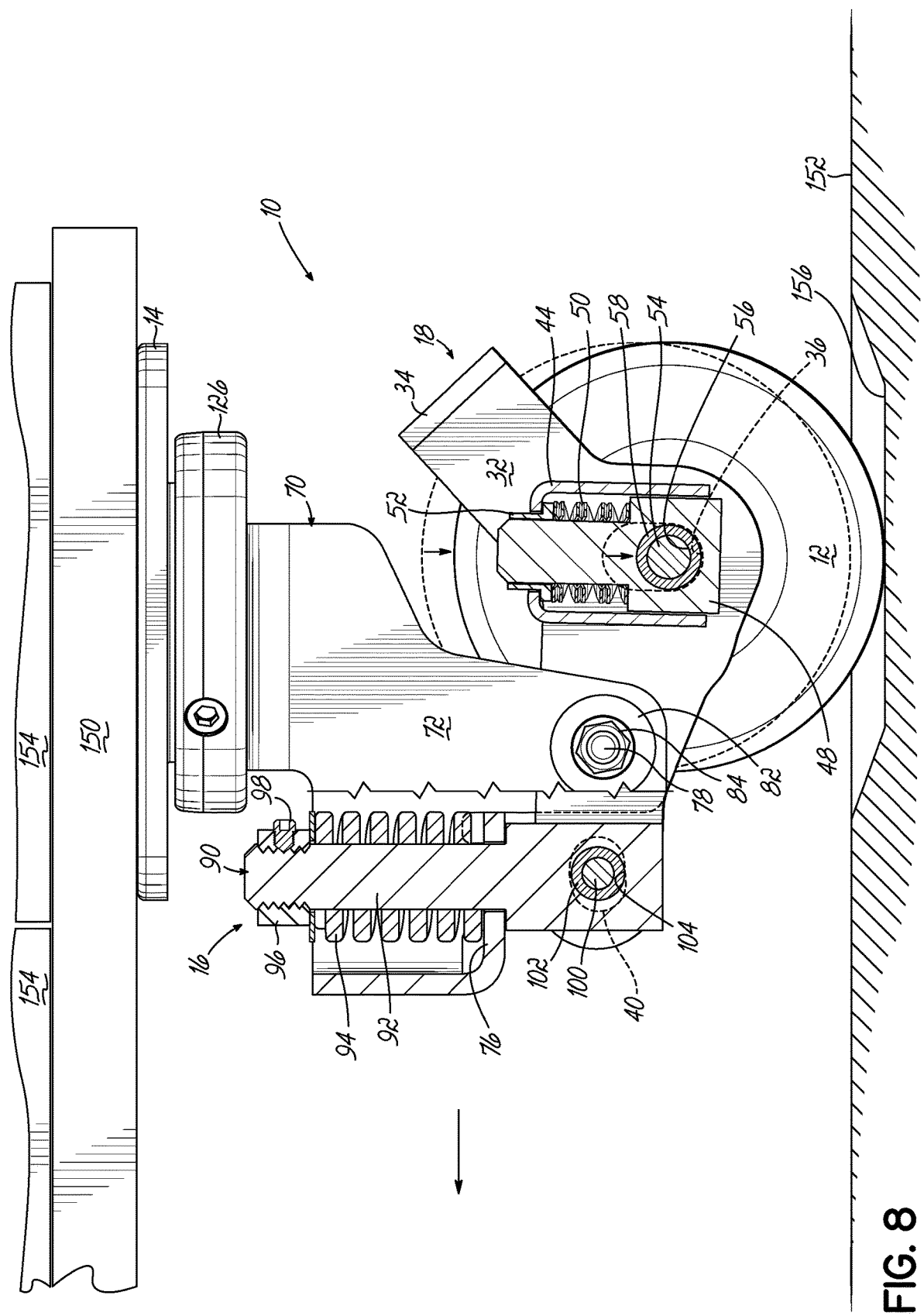
FIG. 8 is a partial cross-sectional view of the swivel caster of FIG. 2 taken along line 7-7 with the wheel in a depression of a support surface.

In one exemplary use, four swivel casters 10 are mounted at the corners of the transport vehicle 150 such as a platform truck to carry the load 154. It will be appreciated that this description of an exemplary use may also be applicable to a rigid caster. Under these loading conditions, the wheel 12 rests upon the support surface 152 and the arm assembly 18 achieves the neutral position shown in FIG. 7. With reference to FIG. 8, as the transport vehicle 150 moves (from right to left in FIG. 8) across the support surface 152, one of the four swivel casters 10 may encounter a depression 156 in the support surface 152. As the wheel 12 enters the depression 156, the wheel stage springs 50 push downwardly upon the wheel stage plungers 48 to thereby move wheel axle 54 downward in elongated axle hole 36. The wheel stage plungers 48 slide relative to bushings 52 which do not move as they are biased upwardly against bracket 44 by wheel stage springs 50. This downward movement of the wheel axle 54 also moves the wheel 12 downward into the depression 156 such that wheel 12 maintains contact with the support surface 152. The amount of downward travel of the wheel 12 is govern by the length of the elongated axle hole 36.

During this excursion of the wheel 12 into the depression 156, the arm assembly 18 essentially maintains it neutral position. In other words, the arm assembly 18 does not rotate any appreciable amount relative to the horn assembly 16 when the wheel 12 drops into the depression 156. When the wheel 12 exits the depression 156 and returns to the otherwise level support surface 152, the wheel 12 moves the wheel axle 54 upward and thereby compresses the wheel stage springs 50 back to their normal state as shown in FIG. 7. One advantage of the design of the swivel caster 10 is that when the wheel 12 encounters the depression 156 in the support surface 152, the wheel 12 maintains contact with the support surface 152 (as long as the depth of the depression 156 does not exceed the travel of the wheel axle 54 in the elongated axle hole 36) and the transport vehicle 150 and its load 154 remain essentially level and, therefore, the load 154 is not inclined to fall off the transport vehicle 150. Also because the movement of the wheel 12 in and out of the depression 156 is governed by the wheel stage springs 50, the load 154 on the transport vehicle 150 is less likely to be jarred by the encounter with the depression 156, thereby reducing the chances the load 154 will be damaged when the transport vehicle 150 is operated over a rough support surface. A corresponding rigid caster will experience the same performance characteristics when encountering depressions 156.

Figure 9:
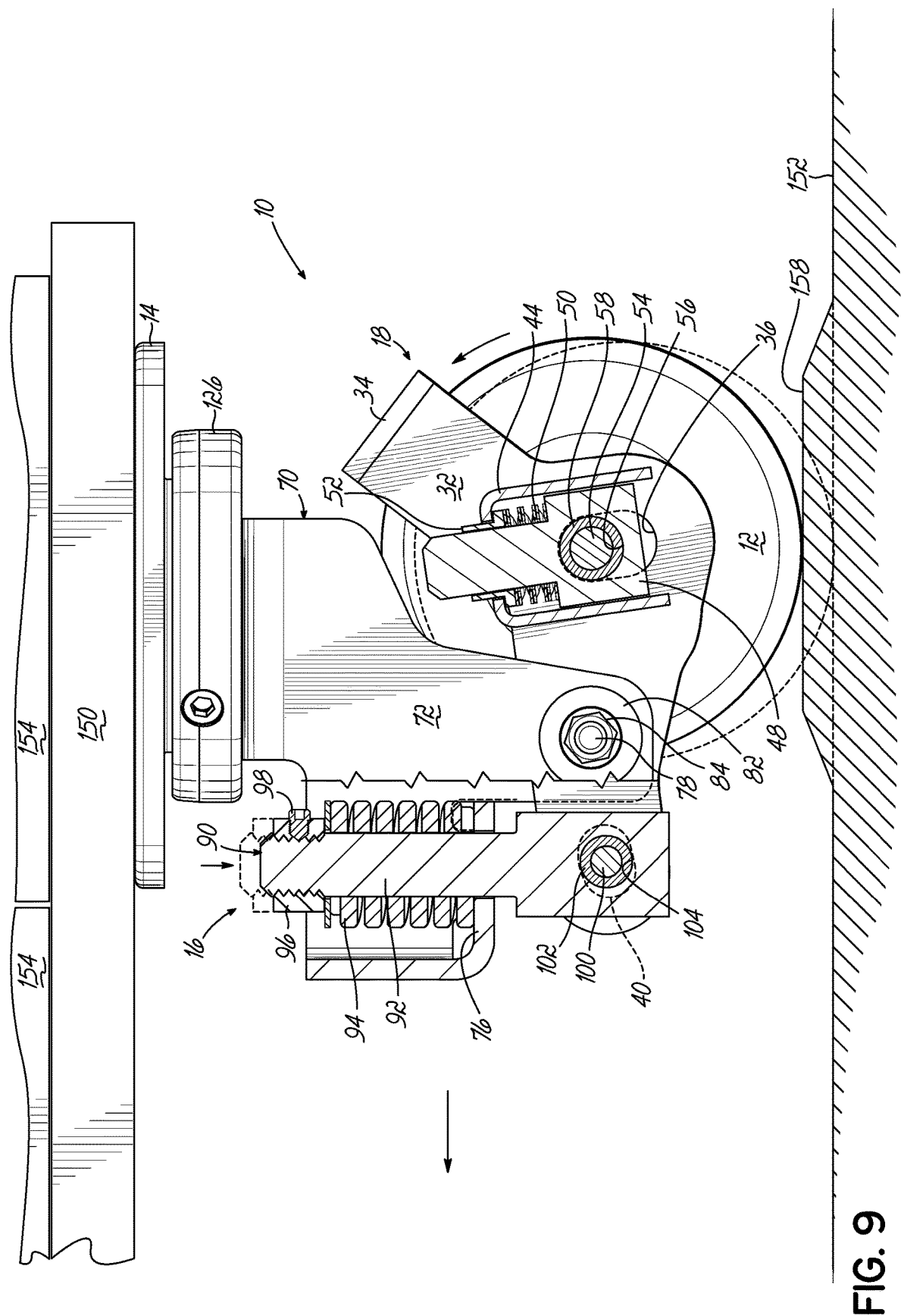
FIG. 9 is a partial cross-sectional view of the swivel caster of FIG. 2 taken along line 7-7 with the wheel on a raised portion of a support surface.

With further reference to the one exemplary use, as the transport vehicle 150 moves across the support surface 152, one of the four swivel casters 10 may encounter a raised portion (bump) 158 in the support surface 152 as shown in FIG. 9. As the wheel 12 moves up and onto the raised portion 158, the arm assembly 18 rotates (counterclockwise in FIG. 9) relative to the horn assembly 16 and the main stage springs 94 compresses further from their preload condition. As the wheel 12 leaves the raised portion 158, the main stage springs 94 begin to extend, pulling the main stage plungers 92 upward, and causing the arm assembly 18 to rotate (clockwise) relative to the horn assembly 16 back towards its neutral position as shown in FIG. 7. During the wheel's 12 encounter with the raised portion 158, the wheel axle 54 continues to reside along the top of the elongated axle hole 36 and the wheel stage springs 50 remain compressed. Another advantage of the design of the swivel caster 10 is that when the wheel 12 encounters the raised portion 158, causing the arm assembly 18 to rotate, the transport vehicle 150 and its load 154 remain essentially level and, therefore, the load 154 is not inclined to fall off the transport vehicle 150. Also because the movement of the wheel 12 over and off of the raised portion 158 is governed by the main stage springs 94, the load 154 on the transport vehicle 150 is less likely to be jarred by the encounter with the raised portion 158, thereby reducing the chances the load 154 will be damaged when the transport vehicle 150 is operated over a rough support surface. A corresponding rigid caster will experience the same performance characteristics when encountering a raised portion (bump) 158 in the support surface 152.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A caster, comprising:
a horn assembly including a first main stage spring operatively coupled to a first main stage plunger;
an arm assembly having a first arm and a second arm, each arm being pivotally coupled to the horn assembly, each arm being operatively coupled to the first main stage plunger;
a wheel disposed between the first arm and the second arm and being rotatably mounted to an axle, the axle extending through an elongated axle hole in each arm of the arm assembly, a wheel stage spring operatively coupled to the axle and configured to bias the axle downwardly in each elongated axle hole, the wheel being movable in the elongated axle hole between an up position and a down position; and
a mounting plate mounted to the horn assembly and configured to be mounted to a transport vehicle,
wherein when the wheel is moved along a support surface, the arm assembly is in a neutral position and the wheel is in the up position, wherein when the wheel moves into a depression in the support surface, the wheel stage spring moves the wheel from the up position to the down position and the arm assembly remains in the neutral position, and wherein when the wheel moves over a raised portion in the support surface, the arm assembly pivots relative to the horn assembly so as to compress the first main stage spring.

2. The caster of claim 1, wherein the first arm includes a bracket, the wheel stage spring slidably mounted to a wheel stage plunger, the wheel stage plunger mounted to the axle and operatively coupled to the bracket.

3. The caster of claim 1, wherein the horn assembly further includes a main stage plunger rod configured to operatively couple the first main stage plunger to the first arm and the second arm.

4. The caster of claim 1, wherein the first main stage spring is preloaded to a predetermined amount.

5. The caster of claim 1, wherein the horn assembly further includes a second main stage spring operatively coupled to a second main stage plunger.

6. The caster of claim 5, wherein the horn assembly further includes a main stage plunger rod configured to operatively couple the first main stage plunger to the first arm and the second main stage plunger to the second arm.

7. The caster of claim 6, wherein the horn assembly further includes an inner spacer mounted to the main stage plunger rod between the first main stage plunger and the second main stage plunger.

8. The caster of claim 7, wherein the horn assembly further includes a first outer spacer mounted to the main stage plunger rod between the first main stage plunger and the first arm and a second outer spacer mounted to the main stage plunger rod between the second main stage plunger and the second arm.

9. The caster of claim 1, wherein the mounting plate is rotatably mounted to the horn assembly.

10. The caster of claim 1, wherein the mounting plate is fixedly mounted to the horn assembly.

11. A transport vehicle configured to move along a support surface and including at least one caster, the at least one caster comprising:
- a horn assembly including a first main stage spring operatively coupled to a first main stage plunger;
- an arm assembly having a first arm and a second arm, each arm being pivotally coupled to the horn assembly, each arm being operatively coupled to the first main stage plunger;
- a wheel disposed between the first arm and the second arm and being rotatably mounted to an axle, the axle extending through an elongated axle hole in each arm of the arm assembly, a wheel stage spring operatively coupled to the axle and configured to bias the axle downwardly in each elongated axle hole, the wheel being movable in the elongated axle hole between an up position and a down position; and
- a mounting plate mounted to the horn assembly and mounted to the transport vehicle,
- wherein when the wheel is moved along the support surface, the arm assembly is in a neutral position and the wheel is in the up position, wherein when the wheel moves into a depression in the support surface, the wheel stage spring moves the wheel from the up position to the down position and the arm assembly remains in the neutral position, and wherein when the wheel moves over a raised portion in the support surface, the arm assembly pivots relative to the horn assembly so as to compress the first main stage spring.

12. The transport vehicle of claim 11, wherein the first arm includes a bracket, the wheel stage spring slidably mounted to a wheel stage plunger, the wheel stage plunger mounted to the axle and operatively coupled to the bracket.

13. The transport vehicle of claim 11, wherein the horn assembly further includes a main stage plunger rod configured to operatively couple the first main stage plunger to the first arm and the second arm.

14. The transport vehicle of claim 11, wherein the first main stage spring is preloaded to a predetermined amount.

15. The transport vehicle of claim 11, wherein the horn assembly further includes a second main stage spring operatively coupled to a second main stage plunger.

16. The transport vehicle of claim 15, wherein the horn assembly further includes a main stage plunger rod configured to operatively couple the first main stage plunger to the first arm and the second main stage plunger to the second arm.

17. The transport vehicle of claim 16, wherein the horn assembly further includes an inner spacer mounted to the main stage plunger rod between the first main stage plunger and the second main stage plunger.

18. The transport vehicle of claim 17, wherein the horn assembly further includes a first outer spacer mounted to the main stage plunger rod between the first main stage plunger and the first arm and a second outer spacer mounted to the main stage plunger rod between the second main stage plunger and the second arm.

19. The transport vehicle of claim 11, wherein the mounting plate is rotatably mounted to the horn assembly.

20. The transport vehicle of claim 11, wherein the mounting plate is fixedly mounted to the horn assembly.

* * * * *